(12) United States Patent
Miyajima et al.

(10) Patent No.: US 11,255,044 B2
(45) Date of Patent: *Feb. 22, 2022

(54) RECORDING METHOD

(71) Applicant: Seiko Epson Corporation, Tokyo (JP)

(72) Inventors: Yoshitaka Miyajima, Matsumoto (JP); Yuki Wakushima, Matsumoto (JP); Nao Kozaka, Matsumoto (JP); Hideki Oguchi, Shiojiri (JP); Takuya Sonoyama, Fujimi (JP)

(73) Assignee: Seiko Epson Corporation

( * ) Notice: Subject to any disclaimer, the term of this patent is extended or adjusted under 35 U.S.C. 154(b) by 293 days.

This patent is subject to a terminal disclaimer.

(21) Appl. No.: 16/140,681

(22) Filed: Sep. 25, 2018

(65) Prior Publication Data

US 2019/0093283 A1  Mar. 28, 2019

(30) Foreign Application Priority Data

Sep. 27, 2017  (JP) .............................. JP2017-185987

(51) Int. Cl.
*D06P 5/30* (2006.01)
*C09D 11/328* (2014.01)
(Continued)

(52) U.S. Cl.
CPC ................ *D06P 5/30* (2013.01); *C09B 45/16* (2013.01); *C09D 11/328* (2013.01); *C09D 11/38* (2013.01);
(Continued)

(58) Field of Classification Search
None
See application file for complete search history.

(56) References Cited

U.S. PATENT DOCUMENTS 5,250,121 A  10/1993  Yamamoto et al.
5,674,314 A  10/1997  Auslander et al.
(Continued)

FOREIGN PATENT DOCUMENTS

CN  102504648 A  6/2012
CN  107163685 A  9/2017
(Continued)

OTHER PUBLICATIONS

English translation of JP 2016/135822, Jul. 2016; 24 pages.*
(Continued)

*Primary Examiner* — Anthony M Liang
(74) *Attorney, Agent, or Firm* — Harness, Dickey & Pierce, P.L.C.

(57) ABSTRACT

An ink jet recording method performed on a fabric to which a hydrotropic agent is attached includes attaching an ink jet composition for textile printing including a metal complex salt dye, in which a hue angle ∠h° defined in CIELAB color space on printed textiles after printing is in a range of 260° or more and 310° or less, to the fabric using an ink jet method, in which there is a region in which a value of a ratio of a mass of the metal complex salt dye with respect to a total mass of dyes included in the ink jet composition for textile printing is 0.6 or more and 1.0 or less, and a value of a ratio of mass of the metal complex salt dye with respect to a mass of the hydrotropic agent in the fabric is 0.2 or more and 1.0 or less.

12 Claims, 1 Drawing Sheet

(51) Int. Cl.

| | | |
|---|---|---|
| *C09D 11/40* | (2014.01) | |
| *D06P 1/39* | (2006.01) | |
| *D06P 1/38* | (2006.01) | |
| *C09B 45/16* | (2006.01) | |
| *D06P 1/10* | (2006.01) | |
| *C09D 11/38* | (2014.01) | |
| *D06P 5/00* | (2006.01) | |
| *D06P 1/14* | (2006.01) | |
| *D06P 1/673* | (2006.01) | |
| *D06P 5/20* | (2006.01) | |

(52) U.S. Cl.
CPC ............... *C09D 11/40* (2013.01); *D06P 1/10* (2013.01); *D06P 1/14* (2013.01); *D06P 1/38* (2013.01); *D06P 1/39* (2013.01); *D06P 5/002* (2013.01); *D06P 1/6735* (2013.01); *D06P 5/20* (2013.01)

(56) References Cited

U.S. PATENT DOCUMENTS

| | | | |
|---|---|---|---|
| 5,897,694 A | 4/1999 | Woolf | |
| 6,007,611 A | 12/1999 | Mheidle et al. | |
| 6,153,263 A * | 11/2000 | Haruta | D06P 5/001 |
| | | | 427/261 |
| 6,293,667 B1 | 9/2001 | Gregory et al. | |
| 6,723,137 B1 | 4/2004 | Hakamada et al. | |
| 8,349,029 B2 | 1/2013 | Worner et al. | |
| 2003/0172840 A1* | 9/2003 | Blank | D06P 5/30 |
| | | | 106/31.27 |
| 2004/0003755 A1* | 1/2004 | Fukumoto | C09D 11/32 |
| | | | 106/31.58 |
| 2005/0036018 A1* | 2/2005 | Yanagihara | D06P 5/30 |
| | | | 347/100 |
| 2005/0172856 A1 | 8/2005 | Hasemann | |
| 2007/0101900 A1 | 5/2007 | Wheeler et al. | |
| 2007/0266887 A1 | 11/2007 | Koganehira et al. | |
| 2008/0032098 A1* | 2/2008 | Hornby | D06P 5/30 |
| | | | 428/195.1 |
| 2012/0216356 A1 | 8/2012 | Worner et al. | |
| 2013/0328979 A1 | 12/2013 | Shimizu et al. | |
| 2014/0157530 A1 | 6/2014 | Murai | |
| 2014/0375733 A1 | 12/2014 | Murai et al. | |
| 2015/0166807 A1 | 6/2015 | Komatsu | |
| 2015/0252200 A1 | 9/2015 | Kagata et al. | |
| 2016/0272834 A1 | 9/2016 | Kobayashi et al. | |
| 2016/0326384 A1 | 11/2016 | Chen et al. | |
| 2017/0009092 A1 | 1/2017 | Gotou et al. | |
| 2017/0275485 A1 | 9/2017 | Oki et al. | |
| 2018/0030292 A1 | 2/2018 | Gotou et al. | |
| 2018/0086929 A1* | 3/2018 | Hayashi | D06P 5/30 |
| 2018/0179406 A1 | 6/2018 | Miyajima et al. | |
| 2018/0179407 A1 | 6/2018 | Miyajima et al. | |
| 2018/0215939 A1 | 8/2018 | Mizuno | |
| 2018/0244934 A1 | 8/2018 | Murai et al. | |
| 2019/0031899 A1* | 1/2019 | Oki | C09D 11/328 |
| 2019/0093283 A1 | 3/2019 | Miyajima et al. | |
| 2019/0100669 A1 | 4/2019 | Murai | |
| 2019/0105919 A1 | 4/2019 | Katsuragi | |
| 2019/0249025 A1* | 8/2019 | Miyajima | C09D 11/40 |
| 2019/0284426 A1 | 9/2019 | Matsuzaki et al. | |
| 2020/0095443 A1* | 3/2020 | Kozaka | D06P 1/6491 |
| 2020/0095444 A1 | 3/2020 | Hagiwara et al. | |
| 2020/0131390 A1 | 4/2020 | Sakuma et al. | |

FOREIGN PATENT DOCUMENTS

| | | |
|---|---|---|
| DE | 10135042 A1 | 2/2003 |
| EP | 1357158 A1 | 10/2003 |
| EP | 2311917 A1 | 4/2011 |
| EP | 2412761 A1 | 2/2012 |
| EP | 3091056 A1 | 11/2016 |
| EP | 3299426 A1 | 3/2018 |
| JP | 61-002772 A | 1/1986 |
| JP | H08-259867 A | 10/1996 |
| JP | H11-012957 A | 1/1999 |
| JP | 2002-241639 A | 8/2002 |
| JP | 2004-359928 A | 12/2004 |
| JP | 2004-536180 A | 12/2004 |
| JP | 2009-227895 A | 10/2009 |
| JP | 2012-511591 A | 5/2012 |
| JP | 2014-062142 A | 4/2014 |
| JP | 2015-183311 A | 10/2015 |
| JP | 2016-044258 A | 4/2016 |
| JP | 2016-044259 A | 4/2016 |
| JP | 2016/135822 A * | 7/2016 |
| JP | 2017-115094 A | 6/2017 |
| JP | 2017-214457 A | 12/2017 |
| JP | 2017-214668 A | 12/2017 |
| JP | 2018-109140 A | 7/2018 |
| WO | WO-2010-013649 A1 | 2/2010 |

OTHER PUBLICATIONS

Extended European Search Report for Patent Application No. EP18197517.8 dated Feb. 11, 2019 (11 pages).
Extended European Search Report for Application No. EP 17 20 8431 dated May 3, 2018 (8 pages).
Database WPI, Week 201651, Thomson Scientific, London, GB, AN 2016-459671, XP002780277 (2 pages).
Aptoula et al., "Morphological Description of Color Images for Content-Based Image Retrieval", IEEE Transactions on Image Processing 18(11), Dec. 2009, pp. 2505-2517, 13 pages.
Hansen Solubility Parameters Table from Diversified Enterprises, URL: https://www.accudynetest.com/solubility_table.html, 5 pages.
Database WPI, Week 201651, Thomson Scientific, London, GB, AN 2016-459671, XP002780327 (2 pages).
Database WPI, Week 201575, Thomson Scientific, London, GB, AN 2015-63684Y, (2 pages).
Database WPI, Week 198608, Thomson Scientific, London, GB, AN 1986-050894, (2 pages).
Database WPI, Week 201263, Thomson Scientific, London, GB, AN 2012-J53239 (3 pages).
Extended European Search Report for Patent Application No. EP 17208435.2 dated May 3, 2018 (10 pages).
Caprolactam datasheet, https: / /www.chemenu.com /products /CM200169, no date available; 2 pages.

* cited by examiner

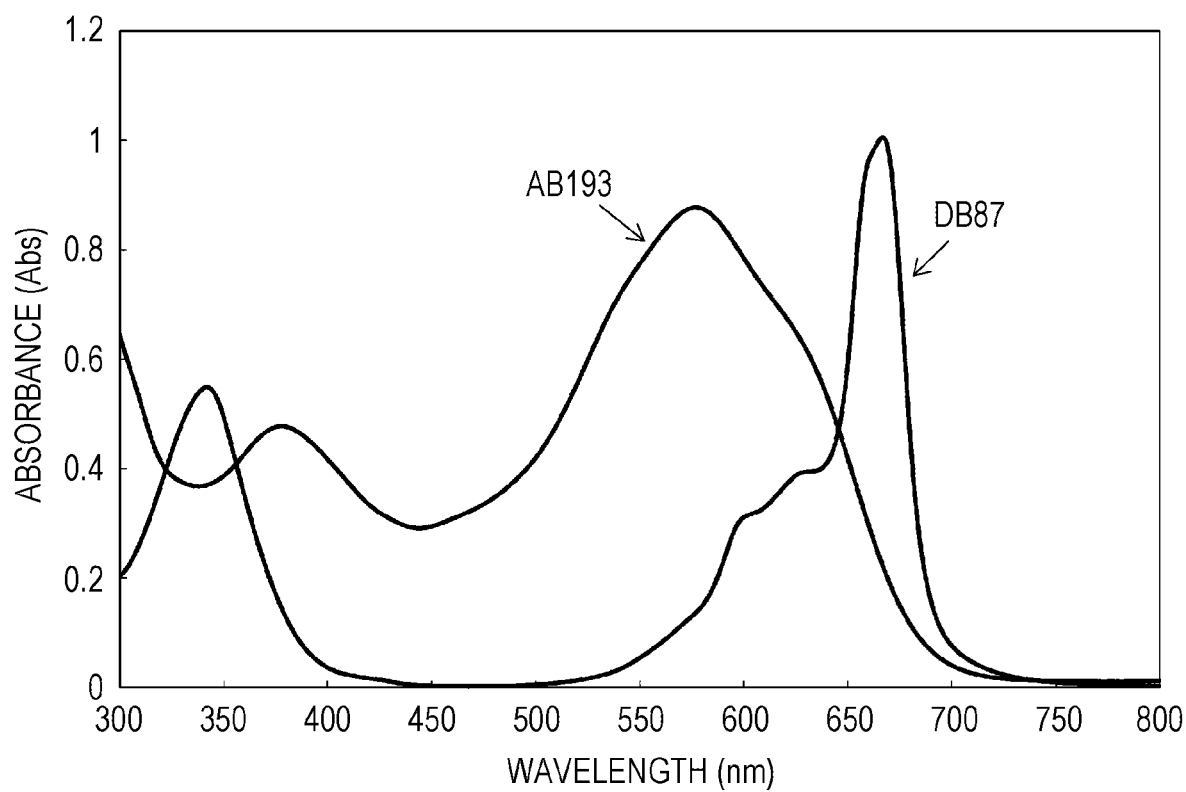

RECORDING METHOD

BACKGROUND

1. Technical Field

The present invention relates to a recording method.

2. Related Art

In an ink jet recording method, the recording is performed by ejecting small droplets of ink from fine nozzles and attaching the droplets to a recording medium. This method is able to record high resolution and high-quality images at a high speed with a relatively inexpensive apparatus. In the ink jet recording method, there are a large number of factors to be studied, including the properties of the ink used, the stability in recording, and the quality of the image to be obtained, and there are active studies not only on the ink jet recording apparatus but also on the ink compositions to be used.

In addition, the ink jet recording method is also used to dye (textile printing) fabrics and the like. In the related art, a screen textile printing method, a roller textile printing method, and the like have been used as textile printing methods for fabrics (woven fabrics and nonwoven fabrics), but since applying the ink jet recording method is advantageous from various viewpoints such as small-lot productivity and immediate printability, various studies are being carried out in relation thereto.

Various performances are also required for ink compositions used for textile printing ink jet recording, but from the viewpoint of dyeing fabric, performances which are not necessary for a normal ink composition may be required. Therefore, there are also many factors to be studied with regard to ink jet compositions for textile printing.

For example, reactive groups which react during textile printing may deteriorate during storage. In relation to this, JP-A-2002-241639 discloses a liquid composition which contains a monochlorotriazine-based reactive dye and tris (hydroxymethyl(methyl) aminomethane for the purposes of reducing the likelihood of decomposition in reactive groups which react at the time of textile printing and obtaining high temporal stability (storage stability).

In addition, in ink jet textile printing, an ink set provided with dye inks of four colors of YMCK (yellow, magenta, cyan and black) is often used. However, when such an ink set is used in an ink jet textile printing method, it may not be possible to completely reproduce the hue range obtained by the screen textile printing method. For example, International Publication No. WO 2010/013649 proposes a reactive dye ink set for ink jet textile printing which is provided with a cyan ink composition containing C.I. Reactive Blue 15:1 and a magenta ink composition containing C.I. Reactive Red 245, in order to widen the color reproduction range, particularly the color reproduction range in the hue range of magenta to violet to blue to cyan.

In ink jet textile printing, there is a demand to increase the storage stability of the ink and widen the color reproduction range of the printed textiles as disclosed in JP-A-2002-241639 and International Publication No. WO 2010/013649 described above and the like. In addition, in the same manner as inks used for ordinary ink jet recording, there is a demand to improve the color developing properties of inks and printed textiles (also referred to as recorded matter or printed fabrics) and to increase the light fastness of the printed textiles.

The inventors conducted a long-term outdoor exposure test on printed textiles in ink-jet textile printing and extensively studied the changes in the color developing property, hue, and the like, and, as a result, it was found that changes in hue over time are likely to occur in images of specific hues created with mixed color inks of a plurality of colors such as CMYK (may be referred to below as composites). In particular, it was also found that hues of blue colors (colors with a hue angle $\angle h°$ in a range of 220° or more and 310° or less, in particular, a hue angle $\angle h°$ in a range of 260° or more and 310° or less) such as dark blue, navy-blue (Japan Industrial Standard's JIS common color name), deep blue, Prussian blue, blue, indigo, ultramarine color, and cerulean, were easily changed in a long-term outdoor exposure test of the printed textiles. The inventors presume that such changes in hue are due to the fact that there is a difference in the light fastness of each of the dyes included in the plurality of inks.

SUMMARY

An advantage of some aspects of the invention is to provide a recording method which is able to express colors with a hue angle $\angle h°$ in a range of 260° or more and 310° or less with good a color developing property in printed textiles and which is able to perform recording with good light fastness, without mixing a plurality of colors.

The invention can be realized in the following aspects or application examples.

According to an aspect of the invention, there is provided a recording method which is an ink jet recording method performed on a fabric to which a hydrotropic agent is attached, the method including attaching an ink jet composition for textile printing including a metal complex salt dye, in which a hue angle $\angle h°$ defined in CIELAB color space on printed textiles after textile printing is in a range of 260° or more and 310° or less, to the fabric using an ink jet method, in which there is a region in which a value of a ratio (metal complex salt dye amount/total dye amount) of a mass of the metal complex salt dye with respect to a total mass of dyes included in the ink jet composition for textile printing is 0.6 or more and 1.0 or less, and a value of a ratio (metal complex salt dye/hydrotropic agent) of mass of the metal complex salt dye with respect to a mass of the hydrotropic agent in the fabric is 0.2 or more and 1.0 or less.

According to such a recording method, it is possible to express colors with a hue angle $\angle h°$ in a range of 260° or more and 310° or less with good color developing properties in printed textiles without mixing a plurality of colors and it is possible to suppress hue changes (light fastness) over time. That is, using a fabric to which a hydrotropic agent is attached and an ink jet composition for textile printing including a metal complex salt dye, and carrying out the attachment such that the ratio (metal complex salt dye amount/total dye amount) is 0.6 or more and 1.0 or less and the value of the ratio (metal complex salt dye/hydrotropic agent) on the fabric is 0.2 or more and 1.0 or less makes it possible to obtain a good color developing property in the printed textiles. Thus, it is possible to express colors with a hue angle $\angle h°$ in a range of 260° or more and 310° or less without mixing a plurality of colors and it is possible to suppress hue changes over time (obtain a good light fastness).

In the recording method, the metal complex salt dye may have a maximum absorption wavelength in a range of 550 nm or more and 600 nm or less.

According to such a recording method, it is possible to express a color having a hue angle ∠h° in the range of 260° or more and 310° or less without mixing a plurality of colors.

In the recording method, the metal complex salt dye may be an acidic dye forming a complex salt with a metal having a valence of 2 or more and 3 or less.

According to such a recording method, the color developing property of a color having a hue angle ∠h° in the range of 260° or more and 310° is even better.

In the recording method, the metal complex salt dye may be a chromium complex salt dye.

According to such a recording method, the color developing property of a color having a hue angle ∠h° in the range of 260° or more and 310° is even better.

In the recording method, a ratio (chromium complex salt dye amount/total metal complex salt dye amount) of a mass of the chromium complex salt dye with respect to a total mass of the metal complex salt dye included in the ink jet composition for textile printing may be 0.7 or more and 1 or less.

According to such a recording method, the content of the metal complex salt dye is sufficient and the color developing property is further improved.

In the recording method, the metal complex salt dye may be C.I. Acid Blue 193.

According to such a recording method, it is possible to more reliably reproduce colors with a hue angle ∠h° in the range of 260° or more and 310° and the color developing property is further improved.

In the recording method, a total content of the metal complex salt dye in the ink jet composition for textile printing may be 3% by mass or more and 15% by mass or less with respect to the entire composition.

According to such a recording method, the content of the metal complex salt dye is sufficient and the color developing property is further improved.

In the recording method, the ink jet composition for textile printing may not contain a cyclic amide having a normal boiling point of 190° C. or more and 260° C. or less.

According to such a recording method, it is possible to suppress increases in the penetration of the ink more than necessary, and to obtain clear image quality without bleeding.

In the recording method, the ink jet composition for textile printing may include a glycol ether, and a content of the glycol ether may be 5% by mass or more and 20% by mass or less with respect to the entire composition.

According to such a recording method, even in a case where foreign matter tends to be generated due to the drying of the metal complex salt dye, moisture retention and solubility by the glycol ether are increased, and, as a result, it is possible to maintain a high recovery from clogging due to being left and continuous ejection stability is improved.

In the recording method, an acidic compound may be further attached to the fabric.

According to such a recording method, it is possible to improve the dyeing reaction between the fabric and the dye.

In the recording method, a pH of a region to which the ink jet composition for textile printing is attached may be 3 or more and 6 or less.

According to such a recording method, it is possible to improve the dyeing reaction between the fabric and the dye.

The recording method may further include heating the fabric after the attaching.

According to such a recording method, it is possible to dye the fabric at a higher speed.

The recording method according to the invention may further include cleaning the fabric obtained in the heating.

In the recording method, the fabric may include fibers including an amide bond.

According to such a recording method, it is possible to carry out improved dyeing.

BRIEF DESCRIPTION OF THE DRAWING

The invention will be described with reference to the accompanying drawings, wherein like numbers reference like elements.

The Figure is an absorbance spectrum in the visible light region of C.I. Acid Blue 193 (AB 193) and C.I. Acid Direct Blue 87 (DB 87).

DESCRIPTION OF EXEMPLARY EMBODIMENTS

A description will be given below of several embodiments of the invention. The embodiments described below illustrate one example of the invention. The invention is not at all limited to the following embodiments, and also includes various modifications which are carried out in a range not changing the gist of the invention. Here, not all of the configurations described below are necessarily essential components of the invention.

The recording method (textile printing method) according to the present embodiment is an ink jet recording method performed on a fabric to which a treatment liquid is attached and includes an attaching step of attaching the ink jet composition for textile printing to a fabric by an ink jet method.

1. Fabric to which Hydrotropic Agent is Attached

It is possible to obtain a fabric to which a hydrotropic agent is attached by attaching a treatment liquid including a hydrotropic agent to the fabric. Fabrics to which a hydrotropic agent is attached may be made using other methods. The step (treatment step) of attaching the treatment liquid including the hydrotropic agent to the fabric is not an essential step in the recording method of the present embodiment, but a description will be given of this treatment step first. A description will be given below of the treatment liquid, the fabric, and the treatment step in this order.

1.1. Treatment Liquid

The treatment liquid contains a hydrotropic agent. The hydrotropic agent has a function of improving the color developing property of the recorded image. The hydrotropic agent may function as a dyeing aid for improving the dyeing property of the dye. Examples of the hydrotropic agents include ureas, without being limited thereto. Specific examples of ureas include, but are not limited to, urea, alkylurea, ethyleneurea, propyleneurea, tetramethylurea, thiourea, guanidinate, tetraalkylammonium halide, 1,3-dimethyl-2-imidazolidinone, and the like. Among these, urea, tetramethylurea, thiourea, and 1,3-dimethyl-2-imidazolidinone are preferable from the viewpoint of improving the color developing property of the recorded image, and urea is particularly preferable. It is possible to use one kind or two or more kinds of hydrotropic agents. It is possible for the content of the hydrotropic agent to be 1% by mass or more and 30% by mass or less in total with respect to the total mass of the treatment liquid, and preferably 3% by mass or more and 20% by mass or less. However, in terms of making the value of the ratio (metal complex salt dye/hydrotropic agent) of the mass of the metal complex salt dye with respect to the mass of the hydrotropic agent on the fabric be 0.2 or more and 1.0 or less more easily, 5% by mass or more and 15% by mass or less is more preferable, and 6% by mass or more and 10% by mass or less is even more preferable.

The treatment liquid may include water. Examples of the water include water obtained by removing ionic impurities as much as possible, such as pure water and ultrapure water such as ion exchanged water, ultra-filtered water, reverse osmosis water, and distilled water. In addition, when water sterilized by ultraviolet irradiation, hydrogen peroxide addition, or the like is used, it is possible to suppress the generation of bacteria and fungi in a case where the treatment liquid is stored for a long time.

The content of water is 30% by mass or more with respect to the total amount of treatment liquid, preferably 40% by mass or more, more preferably 45% by mass or more, and even more preferably 50% by mass or more. When referring to the water in the treatment liquid, for example, water included in the raw material and water to be intentionally added are included. The content of water being 50% by mass or more makes it possible for the treatment liquid to have a relatively low viscosity. In addition, the upper limit of the content of water is preferably 98% by mass or less with respect to the total amount of the treatment liquid, more preferably 95% by mass or less, and even more preferably 90% by mass or less.

The treatment liquid may contain a gluing agent. Examples of gluing agents include starch substances such as corn and wheat, cellulosic substances such as carboxymethyl cellulose, hydroxymethyl cellulose, and hydroxyethyl cellulose, polysaccharides such as sodium alginate, gum arabic, locust bean gum, trant gum, guar gum, and tamarind seed, proteins such as gelatin and casein, natural water-soluble polymers such as tannin and lignin, and synthetic water-soluble polymers such as polyvinyl alcohol-based compounds, polyethylene oxide-based compounds, acrylic acid-based compounds, and maleic anhydride-based compounds.

One type or two or more types of gluing agents may be used. In a case where a gluing agent is contained in the treatment liquid, the content is, for example, 3% by mass or more and 10% by mass or less with respect to the total amount of the treatment liquid, and preferably 4% by mass or more and 9% by mass or less.

The treatment liquid may contain an acidic compound. In a case where the treatment liquid includes an acidic compound, it is possible to obtain a fabric having both a hydrotropic agent and an acidic compound attached thereto. The acidic compound is preferably used from the viewpoint of further improving the dyeing property of the dye in a case where an acidic dye is used. That is, the acidic compound has an action of activating an alkaline group such as an amide group or an amino group present in the fabric and has an action of positively charging these groups. Therefore, in a case where an acidic dye is included in the ink jet composition for textile printing, an acidic group such as a sulfo group or a carboxyl group present in the acidic dye is charged negatively, thus, it is possible to promote the reaction between the fabric and the acidic dye through electrostatic attraction. In addition, in such a case, the effect becomes more remarkable in a case where the fabric has an amide group or an amino group. Examples of such fabrics include fabrics including fibers having a polyamide (polypeptide) structure such as animal fibers. More specifically, in the case of fabrics including silk, wool, polyamide, and the like, the effect described above becomes more remarkable.

The acidic compound is a compound exhibiting acidity (pH<7) in the presence of moisture or in the case of being an aqueous solution. As specific examples of the acidic compound, carboxylic acid having a carboxyl group in the molecule, organic acids such as sulfonic acid having a sulfo group, ammonium salt of a strong acid, or the like are typically used, and, among these, ammonium sulfate is particularly preferable.

One type or two or more types of acidic compounds may be used. The content in a case where the acidic compound is contained in the treatment liquid is, for example, 1% by mass or more and 7% by mass or less in total with respect to the total amount of the treatment liquid, and preferably 2% by mass or more and 6% by mass or less.

In the treatment step, the treatment liquid is attached to the fabric, and it is possible to confirm whether or not the acidic compound is attached to the fabric by the acidity exhibited when the pH of the water is measured at 25° C. after the fabric is agitated in water at 25° C.

The treatment liquid may include a surfactant. The surfactant is the same as for the ink jet composition for textile printing described above. In a case where a surfactant is blended into the treatment liquid, the total of the surfactant is 0.01% by mass or more and 3% by mass or less with respect to the total of the treatment liquid, preferably 0.05% by mass or more and 2% by mass or less, more preferably 0.1% by mass or more and 1% by mass or less, and particularly preferably blended as 0.2% by mass or more and 0.5% by mass or less. The surfactant being contained in the treatment liquid makes it possible to control the penetrability and wettability of the ink coated on the pre-treated fabric, to improve the color developing property of the printed textiles, and to realize the suppression of bleeding.

The treatment liquid may include a water-soluble organic solvent. The water-soluble organic solvent may be able to improve the wettability of the treatment liquid with respect to the recording medium (fabric). Specific examples of water-soluble organic solvents are the same as the examples in the section of the ink jet composition for textile printing.

The treatment liquid may include a plurality of kinds of water-soluble organic solvents. In a case of including a water-soluble organic solvent, the total content of the water-soluble organic solvent is 0.1% by mass or more and 20% by mass or less with respect to the total amount of the treatment liquid, preferably 0.3% by mass or more and 15% by mass or less, more preferably 0.5% by mass or more and 10% by mass or less, and even more preferably 1% by mass or more and 7% by mass or less.

As necessary, the treatment liquid may include a reduction inhibitor, an antiseptic, a fungicide, a chelating agent, a pH adjusting agent, a viscosity adjusting agent, an antioxidant, an anti-fungal agent, and the like. In a case where these components are added, it is possible to carry out the addition in a blending amount within a range not impairing the functions of the hydrotropic agent, the acidic compound, and the like.

1.2. Manner of Attaching Treatment Liquid to Fabric

It is possible to obtain the fabric to which the hydrotropic agent is attached by attaching the treatment liquid to the fabric and examples of the method of attaching the treatment liquid to the fabric include a method of dipping the fabric into the treatment liquid, a method of coating the treatment liquid on the fabric with a brush or the like, a method of coating the treatment liquid with a roll coater or the like, a method of ejecting the treatment liquid (for example, an ink jet method or a spray method), and the like, and examples thereof include non-contact type and contact type methods or combinations thereof.

In a case where the treatment liquid is attached to the fabric by a method other than the ink jet method, the viscosity at 20° C. is preferably, for example, 1.5 mPa·s or more and 100 mPa·s or less, preferably 1.5 mPa·s or more and 50 mPa·s or less, and more preferably 1.5 mPa·s or more and 20 mPa·s or less. It is possible to measure the viscosity by using a viscoelasticity tester MCR-300 (produced by Pysica) by raising the Shear Rate to 10 to 1000 in an environment of 20° C. and reading the viscosity at Shear Rate 200.

In addition, the treatment liquid may be attached to the fabric by an ink jet method. The treatment step may be carried out in the same ink jet recording apparatus as the attaching step and, in such a case, it is possible to control the region to which the ink jet composition for textile printing is attached and the region to which the treatment liquid is attached, thus, for example, it is easy to control the amount ratio of the treatment liquid and the ink jet composition for textile printing and to reduce the usage amount of the treatment liquid. In a case where the treatment step is performed by the ink jet method, the viscosity of the treatment liquid at 20° C. is preferably 1.5 mPa·s or more and 15 mPa·s or less, more preferably 1.5 mPa·s or more and 5 mPa·s or less, and even more preferably 1.5 mPa·s or more and 3.6 mPa·s or less.

1.3. Fabric

The recording method of the present embodiment is performed by attaching an ink jet composition for textile printing described below to the fabric (recording medium) to which the hydrotropic agent is attached. The fabric is not particularly limited. The material forming the fabric is not particularly limited, and examples thereof include natural fibers such as cotton, hemp, wool, and silk, synthetic fibers such as polypropylene, polyester, acetate, triacetate, polyamide, and polyurethane, biodegradable fibers such as polylactic acid and the like, and blended fibers thereof may be used. As the fabric, any of the fibers described above as examples may be in the form of woven fabric, knitted fabric, nonwoven fabric, or the like. The fabric used in the present embodiment is preferably a fabric formed of fibers including an amide skeleton such as wool, silk, polyamide (including polyamide elastomer) among the above. Using such a fabric makes it possible to obtain better dyeability of the ink jet composition for textile printing.

In addition, the basis weight of the fabric used in the present embodiment is 1.0 oz (ounces) or more and 10.0 oz or less, preferably 2.0 oz or more and 9.0 oz or less, more preferably 3.0 oz or more and 8.0 oz or less, and even more preferably in the range of 4.0 oz or more and 7.0 oz or less.

2. Attaching Step

The recording method of the present embodiment includes an attaching step. The attaching step is a step of attaching the ink jet composition for textile printing to a fabric to which a hydrotropic agent is attached by an ink jet method.

2.1. Ink Jet Composition for Textile Printing

The ink jet composition for textile printing of the present embodiment (also referred to below as an ink composition or the like) is used by being attached to a fabric to which the hydrotropic agent described above is attached (for example, by a treatment liquid) by an ink jet method. A description will be given below of the ink jet composition for textile printing.

The ink jet composition for textile printing used in the attaching step is a composition which includes a metal complex salt dye and in which the hue angle ∠h° defined in the CIELAB color space on the printed textiles after textile printing is in the range of 260° or more and 310° or less.

2.1.1. Metal Complex Salt Dye

The ink jet composition for textile printing of the present embodiment includes a metal complex salt dye. The metal complex salt dye is a dye including at least one metal atom in the structure of the dye molecule and examples thereof include compounds including a structure such as a copper complex, a copper complex salt, a chromium complex, or a chromium complex salt in the molecule. Examples of such dyes include dyes having a phthalocyanine ring skeleton, dyes having a functional group capable of coordinating and bonding with a metal atom, and the like, without being limited thereto.

Specific examples of a dye which is a metal complex salt dye and for which it is easy to set the hue angle ∠h° defined in the CIELAB color space on the recording medium within the range of 220° to 310° in a case of being used as an ink jet composition for textile printing include C.I. Acid Blue 193 (an example of an acidic dye), C.I. Direct Blue 87, and the like, without being limited thereto. In particular, in a case where C.I. Acid Blue 193 is blended alone in an ink jet composition for textile printing, the dye is a dye in which the hue angle ∠h° defined in the CIELAB color space on the recording medium is easy to set in the range of 260° or more and 310°.

The chemical structures of C.I. Acid Blue 193 and C.I. Direct Blue 87 are shown in Formulas (1) and (2), respectively. In the present specification, in each chemical formula, a group represented by "—$SO_3Na$" represents a case where ions which are a pair of "—$SO_3-$" are "$Na^+$". However, the paired ions may each independently be "$H^+$", "$Li^+$", "$K^+$", or the like in each "—$SO_3$—" group in each formula.

C.I. Acid Blue 193: Formula (1)

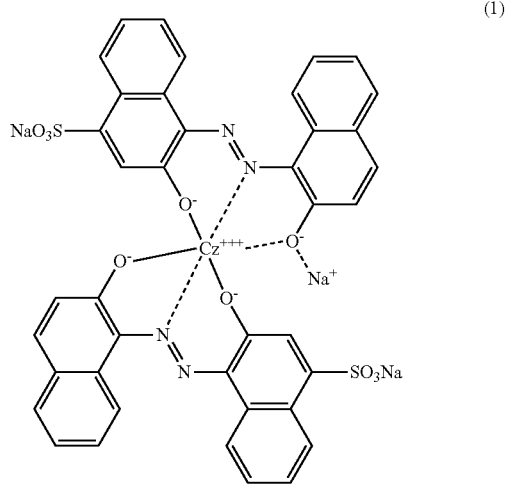

(1)

-continued

C.I. Direct Blue 87: Formula (2)

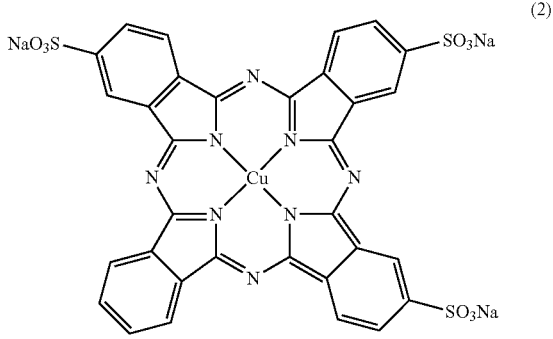

The Figure shows the absorbance spectrum of the visible light region for C.I. Acid Blue 193 (AB 193) and C.I. Direct Blue 87 (DB 87). When a metal complex salt dye having a maximum absorption wavelength in the range of 550 nm or more and 600 nm or less such as C.I. Acid Blue 193 is used, it is possible to express a color having a hue angle ∠h° in the range of 260° or more and 310° or less without mixing of a plurality of colors. Such dyes are not limited to C.I. Acid Blue 193.

Here, it is possible to measure the maximum absorption wavelength by preparing a solution in which the dye is dissolved in an appropriate solvent (water, an organic solvent, or a mixed solution thereof) at an appropriate concentration and measuring the absorbance spectrum in the visible light region thereof. The maximum absorption wavelength refers to the wavelength exhibiting the maximum absorbance even in a case where the absorbance spectrum in the visible light region has, for example, a plurality of maximum points. In addition, it is also possible to carry out measurement of the maximum absorption wavelength of the dye with an ink composition in which the dye is dissolved, and the maximum absorption wavelength may be appropriately determined depending on the dye concentration, but it is possible to carry out measurement by preparing a diluted solution in which the ink composition is diluted 500 to 2000 times with water.

A dye having a maximum absorption wavelength in the range of 550 nm or more and 600 nm or less typically exhibits a color having a hue angle ∠h° in the range of 260° or more and 310° or less. The C.I. Acid Blue 193 described above has a maximum absorption wavelength in the range of 550 nm or more and 600 nm or less.

The maximum absorption wavelength of C.I. Acid Blue 193 and C.I. Direct Blue 87 is as follows. C.I. Acid Blue 193 Maximum absorption wavelength: 577 nm C.I. Direct Blue 87 Maximum absorption wavelength: 666 nm The spectrum shown in the figure is the result of preparing an aqueous solution having a dye concentration of 10 ppm with water as a solvent using a double beam spectrophotometer U-3300 (trade name, produced by Hitachi High-Technologies Corporation), and carrying out measurement using a quartz cell with an optical path length of 10 mm. Measurement of the absorbance spectrum of the dye is not limited to this method and is able to be measured by an appropriate method.

In addition, the metal complex salt dye is more preferably an acidic dye forming a complex salt with a metal having a valence of 2 or more and 3 or less. Selecting such a dye makes it possible to further improve the color developing property of a color having a hue angle ∠h° in the range of 220° to 310° in a textile-printed fabric using an ink jet composition for textile printing. Examples of such a metal complex salt dye include C.I. Acid Blue 193 and C.I. Direct Blue 87 described above.

Furthermore, the metal complex salt dye may be a chromium complex salt dye such as C.I. Acid Blue 193. Selecting such a dye makes it possible to further improve the color developing property of a color having a hue angle ∠h° in the range of 260° or more and 310° in a textile-printed fabric using an ink jet composition for textile printing. If the metal complex salt dye is C.I. Acid Blue 193, it is possible to reproduce colors with a hue angle ∠h° in the range of 260° or more and 310° with higher quality, and it is possible to further improve the color developing properties and light fastness.

The ink jet composition for textile printing used in the recording method of the present embodiment may or may not include a dye other than the metal complex salt dye. In any case, the dye is to be prepared such that the value of the ratio (metal complex salt dye amount/total dye amount) of the mass of the metal complex salt dye with respect to the total mass of the dyes included in the ink jet composition for textile printing is 0.6 or more and 1.0 or less, preferably 0.7 or more and 1.0 or less, and more preferably 0.8 or more and 1.0 or less. Due to this, it is possible to reproduce colors with hue angles ∠h° in the range of 260° or more and 310° in the textile-printed fabric with good quality, and to sufficiently suppress changes in the hue angle over time.

The ink jet composition for textile printing used in the recording method of the present embodiment may include dyes of a plurality of kinds of metal complex salt dyes or may include a single kind of metal complex salt dyes. In a case of containing a chromium complex salt dye, it is possible for the ratio (chromium complex salt dye amount/ total metal complex salt dye amount) of the mass of the chromium complex salt dye with respect to the total mass of the metal complex salt dye included in the ink jet composition for textile printing to be 0.7 or more and 1 or less, preferably 0.8 or more and 1 or less, and more preferably 0.9 or more and 1 or less. As described above, since chromium complex salt dyes such as C.I. Acid Blue 193 are able to reproduce colors with a hue angle ∠h° in the range of 260° or more and 310° with good quality, and are extremely good in terms of the color developing property and light fastness, when using a metal complex salt dye other than the chromium complex salt dye in the blending range described above for the purpose of finely adjusting the range of the hue angle, it is possible to more precisely obtain an image having a good light fastness and a predetermined hue angle.

The total content of the metal complex salt dyes in the ink jet composition for textile printing may be 1% by mass or more and 15% by mass or less with respect to the entire composition, preferably 2% by mass or more and 10% by mass or less, and more preferably 3% by mass or more 15% by mass or less. In this manner, the content of the metal complex salt dye is sufficient and it is possible to obtain a sufficient color developing property.

In a case of using the metal complex salt dye described above as an ink jet composition for textile printing, even with dyes which are able to obtain the hue angle ∠h° defined in the CIELAB color space on the recording medium in the range of 260° or more and 310°, dyes which are not metal complex salt dyes do not always have a sufficient color developing property and hue stability (light fastness) in the printed textiles.

As an example of a dye which is not a metal complex salt dye and in which the hue angle ∠h° defined in the CIELAB color space is easily set in the range of 260° or more and 310°, the chemical structure of C.I. Acid Blue 112 is shown in Formula (3). However, such a dye may be included in the ink jet composition for textile printing of the present embodiment and may be used for fine adjustment of the hue or the like, for example.

C.I. Acid Blue 112: Formula (3)

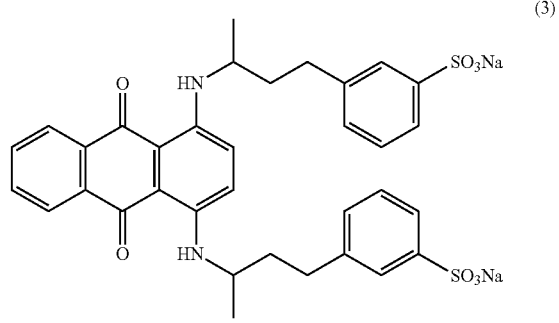

(3)

2.1.2. Hue angle ∠h° Defined in CIELAB Color Space

The ink jet composition for textile printing of the present embodiment is blended with a dye such that the hue angle ∠h° defined in CIELAB color space on printed textiles after textile printing is 260° or more and 310° or less.

Here, the hue angle ∠h° defined in the CIELAB color space is a parameter representing a hue calculated by the following equation using and b* color coordinates of the L* a* b* color space which is a perceptual uniform color space recommended by the International Commission on Illumination (CIE) in 1976. "Hue angle ∠h° =tan$^{-1}$(b*/a*)"

In addition, in "3.6 CIELAB 1976 ab hue angle" of "Colorimetry—Part 4: CIE 1976 L*a*b* color space" in the Japanese Industrial Standard JIS Z 8781-4: 2013, this hue angle ∠h° is also a correlation amount (referred to in combination with JIS Z 8113 03087) of the hue calculated by Formula (11) of "4.2 Amount Related to Each of Brightness, Chroma and Hue" and it may be said that "CIE 1976 L* a* b*" and "CIELAB" are interchangeable.

As defined in the present specification, the hue angle ∠h° defined in the CIELAB color space "on printed textiles after textile printing" of the ink jet composition for textile printing is, for example, able to be determined by measurement using the "5. Spectrophotometric Method" in "Color Measurement Methods—Reflectance and Transmission Object Color" in the Japanese Industrial Standard JIS Z 8722: 2009. The measurement conditions at that time are as follows.

(1) Preparing an ink jet composition for textile printing
(2) Applying ink to a fabric to be textile-printed
(3) Sufficiently reacting by heating, steam or the like
(4) Cleaning the fabric (printed textiles)
(5) Performing spectrophotometry Then, from the obtained measurement results, the hue angle ∠h° is calculated and set as the hue angle ∠h° which is defined in the CIELAB color space on the "printed textiles after textile printing" of the ink jet composition for textile printing.

Examples of a method of adjusting the hue angle ∠h° defined in the CIELAB color space on the printed textiles after textile printing to a range of 260° or more and 310° or less include several methods such as changing the dye itself, and mixing dyes having different hue angles. More specific examples include a method of modifying the conjugated system by changing the number or type of the aromatic rings or the substituents for a specific dye, a method of changing the central metal, a method of mixing different dyes, and the like.

However, among these methods, in a case of adjusting the hue angle by a method of mixing different types of metal complex salt dyes in the ink jet composition for textile printing, such dyes are preferably blended in smaller amounts, for example, a total amount of 1% by mass or less with respect to the total amount of the ink jet composition for textile printing, preferably 0.5% by mass or less, more preferably 0.3% by mass or less, even more preferably 0.1% by mass or less, and particularly preferably 0.05% by mass or less. In this manner, even in a case where the dye fades over time, it is possible to suppress changes in the hue angle in the textile-printed portion to be small. In addition, in a case of including and mixing dyes other than metal complex salt dyes, the closer the hue angles of these dyes are, the more preferable, and in such a case, the blending amounts may be increased, for example, 2% by mass or less in total with respect to the entire ink jet composition for textile printing, preferably 1% by mass or less, more preferably 0.5% by mass or less, even more preferably 0.3% by mass or less, and particularly preferably 0.1% by mass or less.

It is possible to use the metal complex salt dyes by mixing a plurality of types, but from the viewpoint of suppressing the change in hue angle over time in the textile-printed portion to be small, it is preferable to blend a single type. In addition, in the ink jet composition for textile printing of the present embodiment, it is preferable to use only metal complex salt dyes, and more preferable to use a single type of metal complex salt dye. In such a case, a dye other than the metal complex salt dye may be included as long as it is possible to regard the dye as an impurity. That is, the total amount of the dye as the impurity is 1% by mass or less with respect to the entire dye included in the ink jet composition for textile printing, preferably 0.1% by mass or less, more preferably 0.01% by mass or less, even more preferably 0.001% by mass or less, and particularly preferably 0.0001% by mass or less. In this manner, it is possible to perform textile printing in practice with only the metal complex salt dye, and even in a case where such a dye fades over time, changes in the hue angle in the printed textiles are suppressed, which is more preferable.

The total content of the entire dye in the ink jet composition for textile printing of the present embodiment is 2% by mass or more and 30% by mass or less with respect to the total mass of the ink jet composition for textile printing, preferably 3% by mass or more and 15% by mass or less, and more preferably 4% by mass or more and 10% by mass or less.

2.1.3. Other Components

Alkyl Polyol

The ink jet composition for textile printing of the present embodiment may include an alkyl polyol. Including such an alkyl polyol makes it possible to effectively suppress the evaporation of moisture from the recording head due to being left for a long period while further increasing the moisture retention property of the ink jet composition for textile printing and having excellent ejection stability by the ink jet method. In addition, even in a case where a dye of a type which easily causes clogging of the nozzle is used, it is possible to maintain satisfactory recovery after being left and continuous ejection stability.

Specific examples of alkyl polyols include 1,2-butanediol, 1,2-pentanediol, 1,2-hexanediol, 1,2-heptanediol, 1,3-propanediol, 1,3-butanediol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, glycerine, and the like. These alkyl polyols may be used singly as one kind or in a combination of two or more kinds.

In a case where the alkyl polyol is contained, it is possible to obtain the effects if the content is 5% by mass or more with respect to the total mass of the ink jet composition for textile printing, but 5% by mass or more and 30% by mass or less is preferable, 8% by mass or more and 27% by mass or less is more preferable, and 10% by mass or more and 25% by mass or less is even more preferable.

In the present specification, "A is not contained" in the composition does not indicate only that A is completely not contained, but also includes the meaning that A is not intentionally added when producing the composition, and it does not matter if trace amounts of A which are inevitably mixed in or generated during production or storage of the composition. As a specific example of "not containing", for example, 1.0% by mass or more is not included, preferably 0.5% by mass or more is not included, more preferably 0.1% by mass or more is not included, even more preferably 0.05% by mass or more is not included, and particularly preferably 0.01% by mass or more is not included. In addition, the expression "does not contain more than B% by mass" means that inclusion up to B% by mass is permitted.

Surfactant

The ink jet composition for textile printing according to the present embodiment may include a surfactant. It is possible to use the surfactant to decrease the surface tension of the ink jet composition for textile printing and to adjust and improve the wettability (permeability to fabric and the like) with the recording medium. As the surfactant, it is possible to use any of a nonionic surfactant, an anionic surfactant, a cationic surfactant, and an amphoteric surfactant, and these surfactants may be used in combination. In addition, among the surfactants, it is possible to preferably use acetylene glycol-based surfactants, silicone-based surfactants, and fluorine-based surfactants.

Examples of the acetylene glycol-based surfactant are not particularly limited, but examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (the above are all trade names, produced by Air Products and Chemicals. Inc.), OLFINE B, Y, P, A, STG, SPC, E1004, E1010, PD-001, PD-002W, PD-003, PD-004, PD-005, EXP. 4001, EXP. 4036, EXP. 4051, AF-103, AF-104, AK-02, SK-14, and AE-3 (the above are all trade names, produced by Nissin Chemical Co., Ltd.), Acetylenol E00, E00P, E40, and E100 (the above are all trade names, produced by Kawaken Fine Chemicals Co., Ltd.).

The silicone-based surfactant is not particularly limited and preferable examples thereof include polysiloxane-based compounds. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, and BYK-348 (the above are all trade names, produced by BYK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are all trade names, produced by Shin-Etsu Chemical Co., Ltd.).

As the fluorine-based surfactant, it is preferable to use a fluorine-modified polymer, and specific examples thereof include BYK-340 (produced by BYK Japan).

In a case where a surfactant is blended in the ink jet composition for textile printing, the total amount of the surfactant to be blended is 0.01% by mass or more and 3% by mass or less with respect to the total amount of the ink jet composition for textile printing, preferably 0.05% by mass or more and 2% by mass or less, more preferably 0.1% by mass or more and 1.5% by mass or less, and particularly preferably 0.2% by mass or more and 1% by mass or less.

In addition, the ink jet composition for textile printing containing a surfactant tends to increase the stability when ink is ejected from the head. In addition, using an appropriate amount of the surfactant may make it possible to improve the permeability into the fabric and to increase contact with the treatment liquid.

pH Adjusting Agent

In the ink jet composition for textile printing of the present embodiment, it is possible to add a pH adjusting agent for the purpose of adjusting the pH. The pH adjusting agent is not particularly limited and examples thereof include appropriate combinations of acids, bases, weak acids, and weak bases. Examples of acids and bases used for such combinations include inorganic acids such as sulfuric acid, hydrochloric acid, and nitric acid, inorganic bases such as lithium hydroxide, sodium hydroxide, potassium hydroxide, potassium dihydrogen phosphate, sodium dihydrogen phosphate, potassium carbonate, sodium carbonate, sodium hydrogen carbonate, and ammonia, and organic bases such as triethanolamine, diethanolamine, monoethanolamine, tripropanolamine, triisopropanolamine, diisopropanolamine, trishydroxymethylaminomethane (THAM), and the like, and, as organic acids, Good's buffers such as adipic acid, citric acid, succinic acid, lactic acid, N,N-bis(2-hydroxyethyl)-2-aminoethanesulfonic acid (BES), 4-(2-hydroxyethyl)-1-piperazine ethanes acid (HEPES), morpholino ethanesulfonic acid (MES), carbamoylmethyl imino bis acetate (ADA), piperazine-1,4-bis(2-ethanesulfonic acid) (PIPES), N-(2-acetamide)-2-aminoethanesulfonic acid (ACES), colamin hydrochloride, N-tris(hydroxymethyl)methyl-2-aminoethanesulfonic acid (TES), acetamidoglycine, tricine, glycine amide, and bicine, and a phosphate buffer solution, a citrate buffer solution, a tris buffer solution or the like may be used. Furthermore, among these, including tertiary amines such as triethanolamine and triisopropanolamine, and carboxyl group-containing organic acids such as adipic acid, citric acid, succinic acid, and lactic acid as a part or all of the pH adjusting agent is preferable since it is possible to more stably obtain the pH buffering effect.

Water

The ink jet composition for textile printing according to the present embodiment may include water. Since water is the same as described above in the section on the treatment liquid, explanation thereof will be omitted.

Organic Solvent

The ink jet composition for textile printing of the present embodiment may include a water-soluble organic solvent. Examples of the water-soluble organic solvent include lactones such as γ-butyrolactone, betaine compounds, and the like. Furthermore, a glycol ether may be included to make it possible to control the wettability and penetration speed of the composition, thus, it may be possible to improve the color developing property of the image.

Examples of glycol ethers include glycols containing ether bonds such as diethylene glycol, dipropylene glycol, and triethylene glycol, as well as alkyl ethers of glycols selected from ethylene glycol, diethylene glycol, triethylene glycol, polyethylene glycol, propylene glycol, dipropylene glycol, tripropylene glycol, propylene glycol, polypropylene glycol, polyoxyethylene, and polyoxypropylene glycol. Preferable examples include monoalkyl ethers of these glycols, for example, methyltriglycol (triethylene glycol monomethyl ether), butyltriglycol (triethylene glycol monobutyl ether), butyl diglycol (diethylene glycol monobutyl ether), dipropylene glycol mono propyl ether, and the like, and more preferable examples include diethylene glycol monobutyl ether.

A plurality of kinds of such glycol ethers may be used in a mixture. In addition, from the viewpoints of the viscosity adjustment of the ink jet composition for textile printing, the moisturizing effect, and the prevention of clogging by improving the solubility of the dye, the blending amount of the glycol ether is 4.2% by mass or more and 35% by mass or less in total with respect to the total amount of the ink jet composition for textile printing, preferably 4.4% by mass or more and 25% by mass or less, more preferably 5% by mass or more and 20% by mass or less, and even more preferably 6% by mass or more and 15% by mass or less.

A plurality of kinds of such organic solvents may be used in a mixture. In addition, from the viewpoints of the viscosity adjustment of the ink jet composition for textile printing, the moisturizing effect, and the prevention of clogging by improving the solubility of the dye, the blending amount of the organic solvent is 4.2% by mass or more and 35% by mass or less in total with respect to the total amount of the ink jet composition for textile printing, preferably 4.4% by mass or more and 25% by mass or less, more preferably 5% by mass or more and 20% by mass or less, and even more preferably 6% by mass or more and 15% by mass or less.

Saccharides

For the purpose of suppressing solidification and drying of the ink jet composition for textile printing, saccharides may be used. Specific examples of saccharides include glucose, mannose, fructose, ribose, xylose, arabinose, galactose, aldonic acid, glucitol (sorbit), maltose, cellobiose, lactose, sucrose, trehalose, maltotriose, and the like.

Chelating Agent

For the purpose of removing unnecessary ions in the ink jet composition for textile printing, a chelating agent may be used. Examples of chelating agents include ethylenediaminetetraacetic acid and salts thereof (ethylenediaminetetraacetate dihydrogen disodium salt, or nitrilotriacetic acid salt, hexametaphosphoric acid salt, pyrophosphoric acid salt, metaphosphoric acid salt of ethylenediamines, or the like), and the like.

Antiseptic and Fungicide

In the ink jet composition for textile printing, antiseptics and fungicides may be used. Examples of antiseptics and fungicides include sodium benzoate, sodium pentachlorophenol, sodium 2-pyridinethiol-1-oxide, sodium sorbate, sodium dehydroacetate, 1,2-dibenzoisothiazolin-3-one (Proxel CRL, Proxel BDN, Proxel GXL, Proxel XL2, Proxel TN, and Proxel LV, produced by Zeneca Corporation), 4-chloro-3-methylphenol (Preventol CMK or the like, produced by Bayer AG), and the like.

Cyclic Amide

The ink jet composition for textile printing of the present embodiment preferably does not include more than 0.5% by mass of a cyclic amide which is liquid at normal temperatures and has a normal boiling point of 190° C. or more and 260° C. or less, more preferably 0.3% by mass or less, and the cyclic amide is even more preferably not contained. Not including more than 0.5% by mass of such a cyclic amide makes it possible to suppress the penetrability of the ink from becoming higher than necessary, and to obtain clear image quality without bleeding.

Examples of cyclic amides include a compound having a ring structure including an amide group, for example, a compound represented by Formula (4).

(In Formula (4), $R^1$ represents hydrogen or an alkyl group having 1 to 4 carbon atoms, and n represents an integer of 1 to 4. In addition, the alkyl group may be linear or branched.)

Examples of the compound represented by Formula (4) include γ-lactams, β-lactams, and δ-lactams such as 2-pyrrolidone [245° C], 1-methyl-2-pyrrolidone [204° C.] (N-methyl-2-pyrrolidone), 1-ethyl-2-pyrrolidone [212° C.] (N-ethyl-2-pyrrolidone), N-vinyl-2-pyrrolidone [193° C], 1-propyl-2-pyrrolidone, and 1-butyl-2-pyrrolidone, and the like. The numbers in parentheses indicate the normal boiling point.

Other Components

The ink jet composition for textile printing may contain a component other than the above, for example, additives which are able to be normally used in an ink jet ink composition, such as a rust preventive agent, an antioxidant, an ultraviolet absorber, an oxygen absorber, and a dissolution aid.

2.1.4. Production and Physical Properties of Ink Jet Composition for Textile Printing The ink jet composition for textile printing according to the present embodiment is able to be obtained by mixing each of the components described above in an arbitrary order and filtering or the like as necessary to remove impurities. As a method of mixing each of the components, a method in which materials are sequentially added to a container provided with a stirring apparatus such as a mechanical stirrer, or a magnetic stirrer, and stirred and mixed is suitably used.

From the viewpoint of the balance between textile printing quality and reliability as an ink jet ink, the ink jet composition for textile printing according to the present embodiment preferably has a surface tension of 20 to 40 mN/m, and more preferably 22 to 35 mN/m. In addition, from the same viewpoint, the viscosity of the ink jet composition for textile printing at 20° C. is preferably 1.5 to 10 mPa·s, and more preferably 2 to 8 mPa·s. The types of the water-soluble solvents and surfactants described above, the added amounts thereof and of water, and the like may be appropriately adjusted in order to make the surface tension and the viscosity within the above ranges.

In addition, according to such an ink jet composition for textile printing, in a case where the fabric to be textile printed is, for example, cotton, silk, wool (wool), viscose (rayon), polyamide (PA) elastomer, or the like, it is possible to express color in these ranges without mixing a plurality of colors and to further suppress hue changes over time (light fastness). In addition, due to this, in comparison with the related art in which a navy-blue hue is realized by combining a composite ink including a plurality of types of dyes or a plurality of kinds of ink hues (for example: realizing a navy-blue color using YMCK four-color ink set), it is possible to realize better light fastness (that is, suppressing changes in the hue over time).

2.2. Manner of Attaching the Ink Jet Composition for Textile Printing to Fabric In the attaching step, the ink jet composition for textile printing described above is attached to the fabric using the ink jet method. Specifically, the composition is attached to the fabric by an ink jet recording method to form an image on the fabric. As the ink jet recording method, any method may be used, and examples thereof include a charge deflection method, a continuous method, an on-demand method (a piezo method, a bubble jet (registered trademark) method), and the like. Among these ink jet recording methods, a method using a piezo ink jet recording apparatus is particularly preferable.

3. Ratio of Attachment Amount

In the recording method of the present embodiment, there is a region in which the value of the ratio (metal complex salt dye/hydrotropic agent) of the mass of the metal complex salt dye with respect to the mass of the hydrotropic agent in the fabric is 0.2 or more and 1.0 or less. That is, a region in which the value of the ratio (metal complex salt dye/hydrotropic agent) of the mass in a state where the hydrotropic agent included in the fabric and the metal complex salt dye included in the ink jet composition for textile printing are attached to the fabric is 0.2 or more and 1.0 or less is formed on the fabric. In order to carry out the attachment with such a ratio value, the attachment amount and concentration of each of the treatment liquid (hydrotropic agent) and the ink jet composition for textile printing are adjusted.

The value of the ratio (metal complex salt dye/hydrotropic agent) of the mass of the metal complex salt dye with respect to the mass of the hydrotropic agent on the fabric is more preferably 0.3 or more and 1.0 or less, and even more preferably 0.5 or more and 1.0 or less.

When the value of the ratio (metal complex salt dye/hydrotropic agent) of the mass of the metal complex salt dye with respect to the mass of the hydrotropic agent on the fabric is in the above range, it is possible to obtain a sufficient color developing property (textile printing quality).

4. pH of Attachment Region

The attaching step is performed on the fabric to which the hydrotropic agent is attached and, in the attachment region on the fabric to which the ink jet composition for textile printing is attached, the pH is 2 or more and 7 or less, preferably 3 or more and 6 or less, and more preferably 3.5 or more and 6.5 or less. The blending amount of each component of the hydrotropic agent and the ink jet composition for textile printing and the attachment amount in each step are preferably adjusted so as to be within such a range. If the pH of the attachment region is in this range, it is possible to further promote the reaction between the fabric and the dye.

Here, the pH of the attachment region of the ink jet composition for textile printing is a value measured after the attaching step, and in particular, is a value measured before the fabric is steamed or the like after the attaching step in a state where, through the drying step after the treatment step, water is absent or only slightly present. That is, in this specification, the pH of the attachment region of the ink jet composition for textile printing in the fabric is defined as the pH in a state where each component remains in the fabric. Although not particularly limited, the measurement is performed in a state where the residual amount of water at this time is 50% or less with respect to the total mass of water included in the attached treatment liquid and the ink jet composition for textile printing, preferably 30% or less, and more preferably 10% or less.

Accordingly, the pH of the attachment region of the ink jet composition for textile printing on the fabric is measured differently from the pH measurement of an aqueous solution or the like, for example, by a contact type probe. It is possible to carry out the measurement of the pH of the attachment region, for example, using a flat type semiconductor pH electrode. Examples of commercially available products of such electrodes include a combination of a pH analyzer produced by Horiba Ltd., and a flat ISFET pH electrode 0040-10D or the like.

5. Other Steps

The recording method of the present embodiment may include the following steps in addition to the attaching step.

5.1. Treatment Step

The recording method according to the present embodiment may include the treatment step described above. The details of the treatment step have already been described.

5.2. Heat Treatment Step

The recording method according to the present embodiment may include a heat treatment step of heat-treating the fabric to which the ink jet composition for textile printing described above is attached. Performing the heat treatment step gives the dye in the fiber a good tint. As the heat treatment step, it is possible to use methods known in the related art, for example, a high temperature steaming method (HT method), a high pressure steaming method (HP method), a thermosol method, and the like. The temperature in the heat treatment step is preferably in the range of 90° C. or more and 110° C. or less from the viewpoint of reducing damage to the fabric.

5.3. Cleaning Step

The recording method according to the present embodiment may include a cleaning step of cleaning the printed textiles. The cleaning step is preferably performed after the heat treatment step described above, and it is possible to effectively remove the dye which does not tint the fiber. It is possible to perform the cleaning step using, for example, water, and a soaping treatment may be performed as necessary.

5.4. Other Steps

In a case where the recording method according to the present embodiment adopts the treatment step described above, a treatment liquid drying step of drying the treatment liquid imparted to the fabric may be included after the treatment step and before the attaching step described above. The drying of the treatment liquid may be performed by natural drying, but from the viewpoint of improving the drying speed, drying by heating is preferable. In a case of drying by heating in the drying step of the treatment liquid, the heating method is not particularly limited, but examples thereof include a heat press method, an atmospheric pressure steam method, a high-pressure steam method, and a thermofix method. In addition, the heat source for heating is not particularly limited but examples thereof include infrared rays (lamps).

6. Operation and Effects

According to the recording method of the present embodiment, it is possible to express colors with a hue angle ∠h° in a range of 260° or more and 310° or less with good color developing properties in printed textiles without mixing a plurality of colors and it is possible to suppress hue changes (light fastness) over time. That is, by using a fabric to which a hydrotropic agent is attached and an ink jet composition for textile printing including a metal complex salt dye and carrying out the attachment such that the ratio (metal complex salt dye amount/total dye amount) is 0.6 or more and 1.0 or less and the value of the ratio (metal complex salt dye/hydrotropic agent) on the fabric is 0.2 or more and 1.0 or less, it is possible to obtain a good color developing property in the printed textiles. Thus, it is possible to express colors with a hue angle ∠h° in a range of 260° or more and 310° or less without mixing a plurality of colors and it is possible to suppress hue changes over time (light fastness).

7. Examples and Comparative Examples

A more specific description will be given below of the invention with reference to Examples, but the invention is not limited to these Examples.

7.1. Preparation of Treatment Liquid

To obtain the treatment liquids according to the Examples and Comparative Examples, each component was added to a container so as to have the compositions in Table 1, mixed and stirred with a magnetic stirrer for 2 hours, and then filtered through a membrane filter having a pore size of 80 µm. The numerical values in Table 1 indicate % by mass, and ion exchanged water was added such that the total mass of the treatment liquid was 100% by mass.

7.2. Preparation of Ink Jet Composition for Textile Printing

Each component was added to a container so as to have the compositions shown in Table 1, mixed and stirred with a magnetic stirrer for 2 hours and then filtered through a membrane filter having a pore size of 1 µm to obtain the ink jet composition for textile printing according to the Examples and Comparative Examples. The numerical values in Table 1 indicate % by mass, and ion exchanged water was added thereto such that the total mass of the ink jet composition for textile printing was 100% by mass.

TABLE 1

| | | | Example | | | | | | | | | | |
|---|---|---|---|---|---|---|---|---|---|---|---|---|---|
| (% by mass) | | | 1 | 2 | 3 | 4 | 5 | 6 | 7 | 8 | 9 | 10 | 11 |
| Treatment liquid | Gluing agent | Hydroxyethyl cellulose | 7 | 7 | 7 | 7 | 7 | 7 | 7 | 7 | 7 | 7 | 7 |
| | Hydrotropic agent | Urea | 6 | 10 | 6 | 6 | 6 | 15 | 3.5 | 6 | 6 | 6 | 6 |
| | Acidic compound | Ammonium sulfate | 4 | 4 | 4 | 4 | 4 | 4 | 4 | 5 | 3 | 2.5 | 4 |
| | Water | Ion-exchanged water | Remainder | Remainder | Remainder | Remainder | Remainder | Remainder | Remainder | Remainder | Remainder | Remainder | Remainder |
| | | Total | 100 | 100 | 100 | 100 | 100 | 100 | 100 | 100 | 100 | 100 | 100 |
| Ink jet composition for textile printing | Metal complex salt dye | C.I. Acid Blue 193 | 3.5 | 3.5 | 2.8 | 3.15 | 1.96 | 3.5 | 3.5 | 3.5 | 3.5 | 3.5 | 3.5 |
| | | C.I. Direct Blue 87 | — | — | 0.7 | — | 0.84 | — | — | — | — | — | — |
| | Non-metal dye | C.I. Acid Blue 112 | — | — | — | 0.35 | 0.7 | — | — | — | — | — | — |
| | | C.I. Acid Blue 289 | — | — | — | — | — | — | — | — | — | — | — |
| | Ratio of metal complex dye salt/total dye | | 1 | 1 | 1 | 0.9 | 0.8 | 1 | 1 | 1 | 1 | 1 | 1 |
| | Alkyl polyol | Glycerine | 15 | 15 | 15 | 15 | 15 | 15 | 15 | 15 | 15 | 15 | 15 |
| | Glycol ether | Diethylene glycol | 4 | 4 | 4 | 4 | 4 | 4 | 4 | 4 | 4 | 4 | 4 |
| | | Triethylene glycol mono-butyl ether | 5 | 5 | 5 | 5 | 5 | 5 | 5 | 5 | 5 | 5 | 1 |
| | Surfactant | Olfine PD-002W | 1 | 1 | 1 | 1 | 1 | 1 | 1 | 1 | 1 | 1 | 1 |
| | pH adjusting agent | Triethanolamine | 0.5 | 0.5 | 0.5 | 0.5 | 0.5 | 0.5 | 0.5 | 0.5 | 0.5 | 0.5 | 0.5 |
| | Antiseptic | Proxel XL2 | 0.3 | 0.3 | 0.3 | 0.3 | 0.3 | 0.3 | 0.3 | 0.3 | 0.3 | 0.3 | 0.3 |
| | Water | Ion-exchanged water | Remainder | Remainder | Remainder | Remainder | Remainder | Remainder | Remainder | Remainder | Remainder | Remainder | Remainder |
| | | Total | 100 | 100 | 100 | 100 | 100 | 100 | 100 | 100 | 100 | 100 | 100 |
| Ratio of metal complex salt dye attachment amount/hydrotropic agent attachment amount | | | 0.58 | 0.35 | 0.58 | 0.53 | 0.47 | 0.23 | 1.00 | 0.58 | 0.58 | 0.58 | 0.58 |
| Evaluation results | pH on fabric after attaching step | | 4 | 4 | 4 | 4 | 4 | 4 | 4 | 3 | 5 | 6 | 4 |
| | Hue angle of printed textiles | | A | A | A | A | B | A | A | A | A | A | A |
| | Textile material (Color developing property) | Silk | A | A | A | A | B | B | B | A | A | A | A |
| | | Wool | A | A | A | B | B | B | B | A | A | A | B |
| | | PA elastomer | A | A | B | B | B | B | B | A | A | B | B |

TABLE 1-continued

|  |  |  |  |  |  |  |  |  |  |  |  |
|---|---|---|---|---|---|---|---|---|---|---|---|
| Light fastness | Silk | A | A | A | A | B | A | A | A | A | A | A |
|  | Wool | A | A | A | B | B | A | A | A | A | A | A |
|  | PA elastomer | A | A | B | B | B | A | A | A | A | A | A |

|  |  |  | Example |  |  |  | Comparative Example |  |  |  |  |  |  |
|---|---|---|---|---|---|---|---|---|---|---|---|---|---|
| (% by mass) |  |  | 12 | 13 | 14 | 15 | 1 | 2 | 3 | 4 | 5 | 6 | 7 |
| Treatment liquid | Gluing agent | Hydroxyethyl cellulose | 7 | 7 | 7 | 7 | 7 | 7 | 7 | 7 | 7 | 7 | 7 |
|  | Hydrotropic agent | Urea | 6 | 6 | 6 | 6 | 3 | 20 | 6 | 6 | 12 | 12 | 6 |
|  | Acidic compound | Ammonium sulfate | 4 | 2 | 4 | 4 | 4 | 4 | 4 | 4 | 4 | 4 | 4 |
|  | Water | Ion-exchanged water | Remainder | Remainder | Remainder | Remainder | Remainder | Remainder | Remainder | Remainder | Remainder | Remainder | Remainder |
|  |  | Total | 100 | 100 | 100 | 100 | 100 | 100 | 100 | 100 | 100 | 100 | 100 |
| Ink jet composition for textile printing | Metal complex salt dye | C.I. Acid Blue 193 | 3.5 | 3.5 | 3.5 | 3.5 | 3.5 | 3.5 | — | — | — | — | 1.75 |
|  |  | C.I. Direct Blue 87 | — | — | — | — | — | — | — | — | 7 | 4 | — |
|  | Non-metal dye | C.I. Acid Blue 112 | — | — | — | — | — | — | 3.5 | 2 | — | — | 1.75 |
|  |  | C.I. Acid Blue 289 | — | — | — | — | — | — | — | 1.5 | — | 3 | — |
|  | Ratio of metal complex dye salt/total dye |  | 1 | 1 | 1 | 1 | 1 | 1 | — | — | 1 | 0.57 | 0.5 |
|  | Alkyl polyol | Glycerine | 15 | 15 | 15 | 15 | 15 | 15 | 15 | 15 | 15 | 15 | 15 |
|  | Glycol ether | Diethylene glycol | 4 | 4 | 4 | 4 | 4 | 4 | 4 | 4 | 4 | 4 | 4 |
|  |  | Triethylene glycol monobutyl ether | 16 | 5 | 0.5 | 17 | 5 | 5 | 5 | 5 | 5 | 5 | 5 |
|  | Surfactant | Olfine PD-002W | 1 | 1 | 1 | 1 | 1 | 1 | 1 | 1 | 1 | 1 | 1 |
|  | pH adjusting agent | Triethanolamine | 0.5 | 0.5 | 0.5 | 0.5 | 0.5 | 0.5 | 0.5 | 0.5 | 0.5 | 0.5 | 0.5 |
|  | Antiseptic | Proxel XL2 | 0.3 | 0.3 | 0.3 | 0.3 | 0.3 | 0.3 | 0.3 | 0.3 | 0.3 | 0.3 | 0.3 |
|  | Water | Ion-exchanged water | Remainder | Remainder | Remainder | Remainder | Remainder | Remainder | Remainder | Remainder | Remainder | Remainder | Remainder |
|  |  | Total | 100 | 100 | 100 | 100 | 100 | 100 | 100 | 100 | 100 | 100 | 100 |
| Ratio of metal complex salt dye attachment amount/hydrotropic agent attachment amount |  |  | 0.58 | 0.58 | 0.58 | 0.58 | 1.17 | 0.18 | 0.00 | 0.00 | 0.58 | 0.33 | 0.29 |
| Evaluation results | pH on fabric after attaching step |  | 4 | 7 | 4 | 4 | 4 | 4 | 4 | 4 | 4 | 4 | 4 |
|  | Hue angle of printed textiles |  | A | A | A | A | A | A | B | A | C | B | B |
|  | Textile material (Color developing property) | Silk | A | B | B | B | C | C | C | C | B | A | B |
|  |  | Wool | B | B | B | B | C | C | C | C | B | A | B |
|  |  | PA elastomer | B | B | B | B | C | C | D | D | B | A | B |
|  | Light fastness | Silk | A | A | A | A | B | B | C | D | E | D | D |
|  |  | Wool | A | A | A | A | B | B | C | D | E | D | D |
|  |  | PA elastomer | A | A | A | A | B | B | C | D | E | D | D |

In Table 1, the described components other than the compound names are as follows.

Olfine PD-002W (trade name, produced by Nissin Chemical Co., Ltd., acetylene glycol surfactant)

Proxel XL2 (trade name, produced by Arch Chemicals)

The maximum absorption wavelengths of the used dyes are as follows.

C.I. Acid Blue 193 Maximum absorption wavelength: 577 nm

C.I. Direct Blue 87 Maximum absorption wavelength: 666 nm

C.I. Acid Blue 112 Maximum absorption wavelength: 633 nm

C.I. Acid Red 289 Maximum absorption wavelength: 527 nm

The maximum absorption wavelength of the dye was measured using a quartz cell with an optical path length of 10 mm by preparing an aqueous solution having a dye concentration of 10 ppm with water as a solvent using a double beam spectrophotometer U-3300 (trade name, produced by Hitachi High-Technologies Corporation). In addition, the optical spectrum of C.I. Acid Blue 193 obtained in this manner is shown in the figure.

7.3. pH Measurement of Fabric after Attaching Step

Using fabrics (silk, wool, and PA elastomer) having a whiteness degree L* in the range of 85 to 95, the treatment liquid of each Example was coated on a fabric, squeezed with a pick-up rate of 80% in a mangle, and dried. Next, the ink jet composition for textile printing of each Example was filled in a cartridge of an ink jet printer PX-G 930 (produced by Seiko Epson Corporation), and the ink jet composition for textile printing was attached to the fabric, on which the treatment step was performed under conditions of an ink injection amount of 23 mg/inch$^2$ at a resolution of 1440 dpi×720 dpi. Thereafter, the pH of the attachment region was measured using a pH analyzer (produced by Horiba, Ltd.) provided with a flat ISFET pH electrode 0040-10D. The measured pH is shown in Table 1. The pH did not change depending on the type of the fabric.

7.4. Evaluation of Hue Angle of Printed Textiles

For each Example, the hue angle ∠h° of the printed textiles was evaluated as follows. Using fabrics (silk, wool, and PA elastomer) having a whiteness degree L* in the range of 85 to 95, the treatment liquid of each Example was coated on a fabric, squeezed with a pick-up rate of 80% in a mangle, and dried. Next, the ink jet composition for textile printing of each Example was filled in a cartridge of an ink jet printer PX-G 930 (produced by Seiko Epson Corporation), and the ink jet composition for textile printing was attached to the fabric, on which the treatment step was performed, with an ink injection amount of 23 mg/inch$^2$, at a resolution of 1440 dpi×720 dpi, to form images.

Next, the fabric on which the image was formed was steamed at 102° C. for 10 minutes and then cleaned at 90° C. for 10 minutes using an aqueous solution including 0.2% by mass of Laccol STA (surfactant produced by Meisei Chemical Works, Ltd.) and dried to obtain each evaluation sample. According to the method of JIS Z 8722: 2009, the hue angle ∠h° of the obtained evaluation sample was determined and evaluated according to the following criteria. The whiteness degree L* was measured using a colorimeter (trade name "Spectrolino", produced by X-RITE, measurement conditions: light source D 65, filter D 65, ɸ2°). The results of evaluating the samples according to the following criteria are shown in Table 1. The measured value of the hue angle did not change depending on the type of fabric.

A: hue angle ∠h° was 280° or more and 300° or less
B: hue angle ∠h° was 260° or more and less than 280°, or more than 300° and 310° or less
C: hue angle ∠h° was less than 260° or greater than 310°

7.5. Evaluation of Printed Quality (Color Developing Property)

An evaluation sample was obtained by the same method as in "Evaluation of Hue Angle of Recorded Matter" described above. The evaluation of the color developing property is performed by measuring the OD value (color density: the sum of the OD value of the cyan component and the OD value of the magenta component) of the image with a colorimeter (trade name "Spectrolino", produced by X-RITE) and the color developing property of the image was evaluated based on the measured OD value. The evaluation criteria are shown below. The evaluation results are shown in Table 1.

A: OD value is 2.6 or more
B: OD value is 2.4 or more and less than 2.6
C: OD value is 2.2 or more and less than 2.4
D: OD value is less than 2.2

7.6. Evaluation of Light Fastness

For each Example, the light fastness of the printed textiles was evaluated as follows. Using the evaluation sample obtained by the evaluation of the hue angle described above, the test was carried out according to ISO 105 B 02 and the results were evaluated according to the following criteria. The evaluation results are shown in Table 1. This evaluation is to examine the color fading and to determine the fastness and does not directly measure the hue angle, but it is possible to determine at least the color changes.

A: Light fastness is grade 5 or higher
B: Light fastness is grade 4 or higher to less than grade 5
C: Light fastness is grade 3 or higher to less than grade 4
D: Light fastness is less than grade 3
E: Hue angle ∠h° of printed textiles is not within the range of 260° or more and 310° or less, and thus not evaluated 7.7. Evaluation Results Using an ink jet composition for textile printing in which the hue angle ∠h° defined in the CIELAB color space on the printed textiles after printing is in the range of 260° or more and 310°, the printed textiles of each Example, which was prepared such that a value of a ratio (metal complex salt dye amount/total dye amount) of a mass of the metal complex salt dye with respect to a total mass of dyes included in the ink jet composition for textile printing was 0.6 or more and 1.0 or less, and a value of a ratio (metal complex salt dye/hydrotropic agent) of mass of the metal complex salt dye with respect to a mass of the hydrotropic agent in the fabric was 0.2 or more and 1.0 or less, was all excellent in hue angle, printing quality (color developing property), and light fastness.

On the other hand, in Comparative Examples 1 and 2 in which the value of the ratio (metal complex salt dye/hydrotropic agent) was less than 0.2 or more than 1.0, the color developing property (printing quality) was bad. This is considered to be due to the fact that when the value of the ratio is small, the diffusibility of the dye on the fabric is excessively high, causing bleeding, and when the value of the ratio is large, the diffusibility of the dye on the fabric is poor and the filling is deteriorated.

In addition, in Comparative Examples 3 and 4 using an ink jet composition for textile printing not including a metal complex salt dye, the color developing property and light fastness were insufficient. In addition, in Comparative Example 5 using C.I. Direct Blue 87, the hue angle was unsuitable.

Furthermore, In Comparative Example 6 including C.I. Direct Blue 87 and C.I. Acid Red 289, although it was possible to make the hue angle suitable, the light fastness was poor. In Comparative Example 6, the ratio (metal complex salt dye amount/total dye amount) is 0.57. In Comparative Example 7 including C.I. Acid Blue 193 and C.I. Acid Blue 112, although it was possible to make the hue angle suitable, the light fastness was poor. In Comparative Example 7, the ratio (metal complex salt dye amount/total dye amount) is 0.50.

In addition, although the color developing property was somewhat inferior in Example 13, it is thought that this was caused by difficulty in proceeding with the dyeing reaction with an acidic dye since only a part of the amide group on the fabric was positively charged in a case where the pH was higher than 6. In addition, looking at Examples 11, 12, 14, and 15, the color developing property was somewhat inferior. This is related to the blending amount of triethylene glycol monobutyl ether, which is thought to be related to the permeability being lower when the blending amount is smaller and the permeability being higher when the blending amount is larger. In addition, it is considered that, when the blending amount of glycol ether increases, image distortion due to ink droplet flight deflection in the ink jet ejection also occurs.

The invention is not limited to the embodiments described above, and various modifications are possible. For example, the invention includes configurations substantially the same as the configuration described in the embodiment (for example, configurations having the same function, method, and result, or configurations having the same object and effect). Further, the invention includes configurations in which non-essential parts of the configuration described in the embodiment are replaced. In addition, the invention includes configurations which achieve the same operation and effects as the configuration described in the embodiment, or a configuration which is able to achieve the same object. In addition, the invention includes configurations in which a known technique is added to the configuration described in the embodiment.

The entire disclosure of Japanese Patent Application No. 2017-185987, filed Sep. 27, 2017 is expressly incorporated by reference herein.

What is claimed is:

1. A recording method which is an ink jet recording method performed on a fabric to which a hydrotropic agent is attached, the method comprising:
   attaching an ink jet composition for textile printing including a metal complex salt dye, in which a hue angle ∠h° defined in CIELAB color space on printed textiles after textile printing is in a range of 260° or more and 310° or less, to the fabric using an ink jet method,
   wherein there is a region in which
   a value of a ratio (metal complex salt dye amount/total dye amount) of a mass of the metal complex salt dye with respect to a total mass of dyes included in the ink jet composition for textile printing is 0.6 or more and 1.0 or less, and
   a value of a ratio (metal complex salt dye/hydrotropic agent) of mass of the metal complex salt dye with respect to a mass of the hydrotropic agent in the fabric is 0.2 or more and 1.0 or less; and
   wherein the metal complex salt dye includes a chromium complex salt dye.

2. The recording method according to claim 1,
   wherein the metal complex salt dye has a maximum absorption wavelength in a range of 550 nm or more and 600 nm or less.

3. The recording method according to claim 1,
   wherein a ratio (chromium complex salt dye amount/total metal complex salt dye amount) of a mass of the chromium complex salt dye with respect to a total mass of the metal complex salt dye included in the ink jet composition for textile printing is 0.7 or more and 1 or less.

4. The recording method according to claim 1,
   wherein the chromium complex salt dye is C.I. Acid Blue 193.

5. The recording method according to claim 1,
   wherein a total content of the metal complex salt dye in the ink jet composition for textile printing is 3% by mass or more and 15% by mass or less with respect to the entire composition.

6. The recording method according to claim 1,
   wherein the ink jet composition for textile printing does not contain a cyclic amide having a normal boiling point of 190° C. or more and 260° C. or less in an amount of more than 0.5% by mass.

7. The recording method according to claim 1,
   wherein the ink jet composition for textile printing includes a glycol ether, and a content of the glycol ether is 5% by mass or more and 20% by mass or less with respect to the entire composition.

8. The recording method according to claim 1,
   wherein an acidic compound is further attached to the fabric.

9. The recording method according to claim 1,
   wherein a pH of a region to which the ink jet composition for textile printing is attached is 3 or more and 6 or less.

10. The recording method according to claim 1, further comprising:
    heating the fabric after the attaching.

11. The recording method according to claim 10, further comprising:
    cleaning the fabric obtained in the heating.

12. The recording method according to claim 1,
    wherein the fabric includes fibers including an amide bond.

* * * * *